Figure 1:
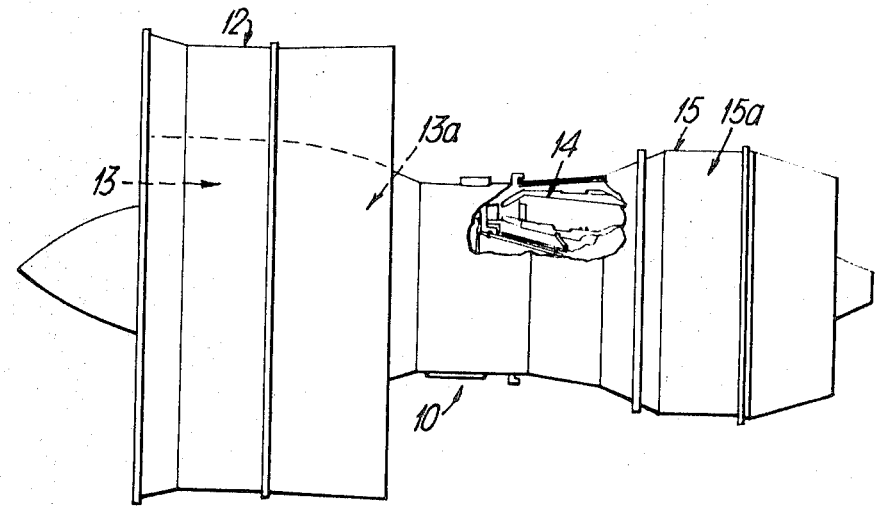

United States Patent

[11] 3,614,257

[72] Inventor David Alexander Campbell
 Derby, England
[21] Appl. No. 55,409
[22] Filed July 16, 1970
[45] Patented Oct. 19, 1971
[73] Assignee Rolls Royce Limited
 Derby, England
[32] Priority July 19, 1969
[33] Great Britain
[31] 36458/69

[54] GAS TURBINE ENGINE
 6 Claims, 2 Drawing Figs.
[52] U.S. Cl. .................................................. 415/176,
 415/106, 415/116
[51] Int. Cl. ......................................................F01d 25/12,
 F01d 5/08
[50] Field of Search ........................................... 415/115,
 116, 112, 111, 176, 106

[56] References Cited
UNITED STATES PATENTS

| | | | |
|---|---|---|---|
| 2,520,697 | 8/1950 | Smith .......................... | 415/106 |
| 2,910,268 | 10/1959 | Davies et al. .................. | 415/DIG. 1 |
| 3,382,670 | 5/1968 | Venable ....................... | 415/176 |
| 3,433,020 | 3/1969 | Earle, Jr. et al. ............... | 415/106 |
| 3,565,543 | 2/1971 | Mrazek ........................ | 415/106 |

FOREIGN PATENTS

| | | | |
|---|---|---|---|
| 446,916 | 10/1947 | Italy ............................... | 415/176 |
| 6,802,034 | 7/1969 | Netherlands ................. | 415/116 |

Primary Examiner—Henry F. Raduazo
Attorney—Cushman, Darby & Cushman

ABSTRACT: A gas turbine engine having means for reducing air frictional drag and consequent heating on a gas turbine engine compressor disc. High-pressure air is tapped from the main airflow of the engine adjacent the compressor disc and directed at an acute angle to the face of the disc. In this way a rotating mass of high-pressure air is produced adjacent to the face of the compressor disc thus cooling and reducing air frictional drag on the disc.

PATENTED OCT 19 1971

3,614,257

Inventor
DAVID ALEXANDER CAMPBELL

By
Cushman Darby & Cushman
Attorneys

GAS TURBINE ENGINE

This invention relates to gas turbine engines.

An object of the present invention is to provide means to reduce the frictional drag and consequent heating, and provide a degree of cooling to the rotor of a gas turbine engine.

According to the present invention a gas turbine engine is provided with means for reducing air frictional drag, and consequent heating on a gas turbine compressor rotor, the means comprising apparatus for tapping high pressure air from the main airflow of the engine adjacent to the compressor disc, and directing it at an acute angle to the face of the disc and in the direction of rotation of the disc, whereby a rotating mass of high-pressure air is produced, adjacent to the face of the compressor disc.

Preferably the pressurized air is tapped from a point downstream of the compressor disc, and supplied to an annular chamber prior to being directed at an acute angle to the face of the compressor disc and in the direction of rotation of the disc.

Preferably the air is directed at an acute angle to the face of the compressor disc by means of a plurality of vanes.

Preferably the plurality of vanes are radially extending vanes and are disposed within the annular chamber.

Preferably the high-pressure air is air tapped from the diffusion zone at an end from the compressor adjacent the combustion chamber.

Preferably the face of the compressor disc is the rearward facing surface of a high-pressure compressor rotor.

An embodiment of the invention will be particularly described by way of example only, and with reference to the accompanying drawings.

Figure 2:
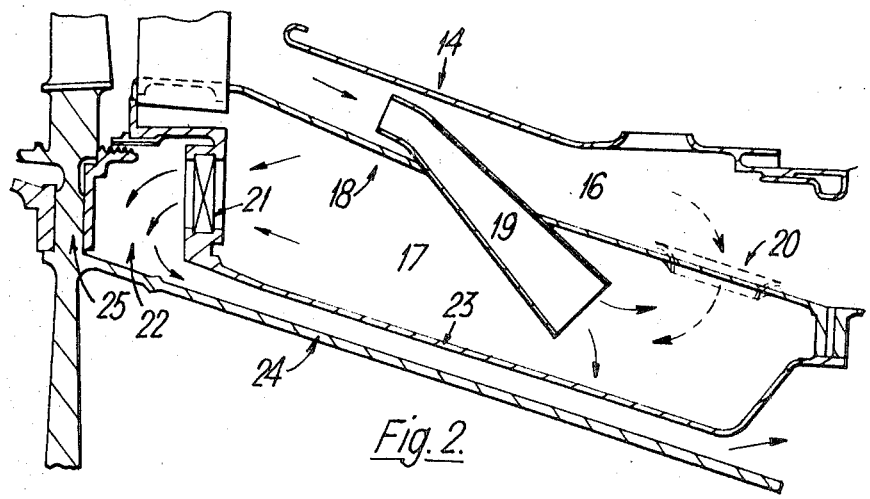

FIG. 1 of which shows a view of a ducted fan gas turbine engine having a broken away section showing combustion equipment and an example of the invention. FIG. 2 shows an enlarged sectional view of the invention as shown in FIG. 1.

At FIG. 1 a ducted fan gas turbine engine shown generally at 10 comprises fan duct 12 and low pressure compressor 13, high-pressure compressor 13a, combustion equipment 14, and high-pressure and low-pressure turbine equipment 15 and 15a arranged in flow series. Disposed radially inward of the combustion equipment 14 is the preferred embodiment of the invention.

At FIG. 2 is shown an inner portion of the combustion equipment 14 which confines an annular diffuser zone 16. Surrounding the annular diffuser zone 16 is provided an annular manifold 17 separated from the diffuser zone by means of liner 18.

The annular diffuser zone 16 communicates with the annular manifold by means of diffusing conduit 19, the conduit 19 being so disposed that it projects outside the liner 18. This projection is provided so that in the event of excess fuel spilling from the combustion chamber it will be unable to spill into the annular manifold 17.

An annular array of radially extending deflector vanes 21 are located upstream and within the annular manifold 17, the deflector vanes 21 communicating with a second annular chamber 22. The second annular chamber is formed by means of liner 23 and high-pressure compressor disc 25 and shaft 24, the high-pressure compressor shaft 24 being rigidly attached to high-pressure compressor disc 25.

In operation high-pressure air passes from the high-pressure compressor 13a to the combustion equipment 14 and the annular diffuser zone 16 which surrounds the combustion equipment.

A portion of the high-pressure air passing through the diffusion zone 16 is tapped off into the annular chamber 17 by means of conduit 19.

The high-pressure air then passes through the deflector vanes 21, the vanes 21 so directing the high-pressure air at an acute angle to produce a mass of air in the second chamber 22 which is rotating at substantially the same speed as the speed of, and in the direction of rotation of the high-pressure compressor disc 25.

In this manner the high-pressure rotating air in the second chamber 22 helps to reduce the frictional drag between the rear face of the compressor disc 25 and the air adjacent to it and also helps provide some degree of cooling to the face of the compressor disc 25 and shaft 24. The air subsequently passes rearward of the engine from the second chamber 22 by means of the annular passage 26 to provide cooling air to the turbine section of the engine.

Alternative means to provide for the flow of air from the diffuser zone 16 to the annular chamber 17 is also shown at FIG. 2 in broken lines, the alternative means comprising flanged orifice 20, the orifice 20 being substituted for conduit 19.

I claim:

1. A gas turbine engine provided with means for reducing air frictional drag and consequent heating on a gas turbine compressor disc, wherein the improvement comprises means for tapping air from the main airflow of the engine adjacent the compressor disc, means defining an annular manifold means supplying said air to said manifold, and means directing the air from said manifold to the face of the compressor disc at an acute angle thereto whereby a rotating mass of high-pressure air is produced adjacent the face of the compressor disc.

2. A gas turbine engine as claimed in claim 1 in which the high-pressure air is tapped from a point downstream of the compressor disc said air being tapped by duct means and being supplied to said annular manifold prior to being directed at an acute angle to the face of the compressor disc, and in the direction of rotation of the compressor disc.

3. A gas turbine engine provided with means for reducing air frictional drag and consequent heating on a gas turbine compressor disc, wherein the improvement comprises means for tapping air from the main airflow of the engine adjacent the compressor disc, means defining an annular manifold means supplying said air to said manifold, and means directing the air from said manifold to the face of the compressor disc at an acute angle thereto whereby a rotating mass of high-pressure air is produced adjacent the face of the compressor disc said air being tapped from the diffusion zone adjacent the combustion chamber.

4. A gas turbine engine as claimed in claim 3 in which the high-pressure air is directed at an acute angle to the face of the compressor disc by means of a plurality of vanes.

5. A gas turbine engine as claimed in claim 4 in which the plurality of vanes are radially extending vanes and are disposed within said annular manifold.

6. A gas turbine engine as claimed in claim 4 in which the face of the compressor disc is the rearmost disc face of the high-pressure compressor rotor.